US009628005B2

United States Patent
Lovas et al.

(10) Patent No.: US 9,628,005 B2
(45) Date of Patent: Apr. 18, 2017

(54) DEVICE FOR DETERMINING A POSITION OF A ROTOR OF AN ELECTRIC MOTOR

(71) Applicants: Ivan Lovas, Prievidza (SK); Viktor Bobek, Hlinik Nad Hronom (SK)

(72) Inventors: Ivan Lovas, Prievidza (SK); Viktor Bobek, Hlinik Nad Hronom (SK)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 14/778,620

(22) PCT Filed: Mar. 28, 2013

(86) PCT No.: PCT/IB2013/052514
§ 371 (c)(1),
(2) Date: Sep. 21, 2015

(87) PCT Pub. No.: WO2014/155158
PCT Pub. Date: Oct. 2, 2014

(65) Prior Publication Data
US 2016/0056741 A1    Feb. 25, 2016

(51) Int. Cl.
*H02P 6/18* (2016.01)
*H02P 6/182* (2016.01)
*H02P 6/185* (2016.01)
*H02P 29/02* (2016.01)

(52) U.S. Cl.
CPC ............ *H02P 6/182* (2013.01); *H02P 6/185* (2013.01); *H02P 29/021* (2013.01)

(58) Field of Classification Search
CPC ......... H02P 6/182; H02P 6/185; H02P 29/021
USPC ............ 318/400.21, 400.32, 400.33, 400.35, 318/400.36, 400.01, 811, 254.1, 400.27, 318/400.34, 599, 721, 799; 361/1, 5; 363/37

See application file for complete search history.

(56) References Cited

U.S. PATENT DOCUMENTS 7,098,623 B2    8/2006 Piippo
7,535,188 B2 *  5/2009 Fukamizu .......... G11B 19/2054
                                                  318/254.1

(Continued)

FOREIGN PATENT DOCUMENTS

| CN | 102201770 | 9/2011 |
|---|---|---|
| JP | 2002165481 | 6/2002 |
| KR | 1020060068844 | 6/2006 |

OTHER PUBLICATIONS

International Search Report and Written Opinion correlating to PCT/IB2013/052514 issued on Dec. 24, 2013.

*Primary Examiner* — Rita Leykin (57) ABSTRACT

A device for determining a rotor position in a polyphase electric motor has a power control unit for applying drive voltages according to a pulse width modulation scheme so as to synchronously drive the motor. A measurement unit is arranged for measuring a voltage value on a respective phase by determining a zero-crossing interval where the phase current is around zero, disconnecting the phase from the respective drive voltage during the zero-crossing interval, and measuring the voltage value when the drive voltage of a first other phase is the supply voltage and the drive voltage of a second other phase is the zero voltage. A position unit is arranged for determining the rotor position based on the voltage value.

19 Claims, 6 Drawing Sheets

(56) References Cited

U.S. PATENT DOCUMENTS

| | | | |
|---|---|---|---|
| 7,667,419 B2 * | 2/2010 | Fukamizu | H02P 6/182 318/400.01 |
| 7,683,587 B2 * | 3/2010 | Inaba | H02P 6/16 322/20 |
| 8,981,693 B2 * | 3/2015 | Fricker | H02P 6/18 318/400.32 |
| 9,071,180 B2 * | 6/2015 | DeFilippis | H02P 23/0004 |
| 9,088,235 B2 * | 7/2015 | Bateman | H02P 6/26 |
| 9,124,206 B2 * | 9/2015 | Bieler | H02P 6/182 |
| 2005/0248306 A1 | 11/2005 | Chen et al. | |
| 2008/0265817 A1 | 10/2008 | Palma | |
| 2010/0026223 A1 | 2/2010 | Liu et al. | |
| 2011/0254483 A1 | 10/2011 | Chen et al. | |
| 2012/0146626 A1 | 6/2012 | Bieler et al. | |
| 2013/0069574 A1 | 3/2013 | Fricker | |

* cited by examiner

DEVICE FOR DETERMINING A POSITION OF A ROTOR OF AN ELECTRIC MOTOR

FIELD OF THE INVENTION

This invention relates to a method and a device for determining a rotor position in a polyphase electric motor having stator coils comprising three phases. The device comprises a power control unit for applying drive voltages on each of the phases, the drive voltages comprising drive pulses alternating between a zero voltage and a supply voltage according to a pulse width modulation scheme so as to generate sinusoidal phase currents in each of the phases for synchronously driving the motor. In the field of synchronous motor driving, several techniques are known that allow rotor position detection based on a sensor which is in connection with a controller of the motor.

Permanent magnet synchronous motors (PMSM) have sequentially energized stator coils that attract or repel a permanent magnet rotor to facilitate rotational motion of the rotor. Usually, the three electrical windings are called phases of the motor. Three phase currents flow through the motor windings, typically at a 120 electrical degree phase relationship with respect to one another. The phase currents create a rotating electro-magnetic field which causes angular motion of the rotor.

Pulse width control of a synchronous motor is arranged to apply the drive voltages to the phases having drive pulses alternating between a zero voltage and a supply voltage according to a pulse width modulation (PWM) scheme so as to generate sinusoidal phase currents in each of the phases for synchronously driving the motor. In synchronous operation the sinusoidal currents have a frequency corresponding to the rotational speed of the motor, whereas the drive pulses alternate at a substantially higher frequency.

In order to drive the rotor in a direction from startup and to maintain a desired rotational speed and torque at steady state, the synchronous drive currents are applied synchronous to the current rotor position. For a proper rotational movement of the rotor, the control of a motor requires information of the position of the rotor with respect to the stator windings. By knowing this position, the control may energize the stator windings in the appropriate sequence to apply a revolving magnetic field in the motor to generate the required rotational torque on the rotor. For detecting the rotor position, it is well known to use measurement data gathered by a speed transducer and/or a position sensor to sense the position of the rotor with respect of the stator windings.

The use of such transducers and/or sensors is costly because it requires additional parts. The increased number of parts contributes to a lower reliability of the motor control since there is a chance to fail under some conditions. Moreover, the additional parts require space within the motor housing. For measuring the position and/or speed of the rotor with respect of the stator, a sensorless back-EMF (Electric Motive Force) control technique is known. The technique is based on back-EMF voltage measurement. The back EMF components are assumed to be a function of rotor position, motor winding current, and rotor speed. However, at low speed operation, the back-EMF voltage amplitude is very low or zero, and thus the position of the rotor is immeasurable.

BACKGROUND OF THE INVENTION

U.S. patent application US 2010/0026223 describes an apparatus and method for determining the position of the rotor in a stationary rotor of a sensor-less permanent magnet synchronous machine. The system employs a rotating magnetic field to identify a magnetic axis of the rotor without a magnetic direction and then determines magnetic direction by applying pulses along the magnet axis in two polarities. In particular, in a first period, the method applies a first electrical signal to the stator coils to create a rotating stator field having a high rotational speed with a strength insufficient to cause a movement of the rotor. Current flow through the stator during this first period is used to detect a current fluctuation caused by anisotropic saliency of the permanent magnet rotor to deduce the magnetic axis. Next, in a second period after the first period, a second electrical signal is applied to the stator coils to produce a magnetic field aligned with the magnetic axis to prevent rotor motion, and current flow through this stator during the second period is used to deduce the magnetic direction and thus the orientation of the rotor. So current pulses are generated into motor to detect rotor position at standstill condition or very low speed, and the rotor magnetic polarity can be recognized. However, it is difficult or impossible to measure position when the motor rotates, and the injected current pulses may cause acoustic noise and shaft vibrations.

SUMMARY OF THE INVENTION

The present invention provides a device and method as described in the accompanying claims. Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

Elements in the figures are illustrated for simplicity and clarity and have not necessarily been drawn to scale.

DETAILED DESCRIPTION OF THE PREFERRED EMBODIMENTS

The present invention will now be described with respect to the accompanying drawings in which like numbered elements represent like parts. The invention is directed to a device 10, shown in FIG. 1, and method 60, shown in FIG. 6, for sensorless detection of a rotor position in a polyphase synchronous electric motor 20, such as a permanent magnet synchronous motor (PMSM).

Sensorless (i.e. without position sensor) control techniques are required nowadays to drive PMSM motors in order to reduce price and increase reliability, but the rotor position must be known to controllably spin PMSM motor.

Sensorless techniques may be based on Back-EMF voltage estimation. A drawback of this method is that the rotor position is unknown during standstill condition and low speed, because the back-EMF voltage is proportional to the motor speed. Thus at low speed or standstill condition the Back-EMF voltage amplitude is very low or zero and it is immeasurable. A method as described below is capable to detect rotor position at low speed operation using circuitry for phase voltage measurement by allowing detection of a rotor position error with respect to the magnetic field as generated by the synchronous drive voltages, e.g. 6 times per one electrical revolution. It is suitable for permanent magnet synchronous motors (PMSM) driven by sensorless/sensored field oriented control (FOC) algorithms.

Prior art solutions may use rotor alignment to align the motor to known position. The alignment is followed by open loop start-up control without position feedback. Once the motor reaches minimal speed, the Back-EMF voltage is monitored for detecting the rotor position. Disadvantages are that the rotor position is unknown during motor start up and low speed, the load torque has to be known in advance, and the application has to be tuned for a particular load.

The novel approach, while driving the motor based on pulse width modulation (PWM), recognizes the rotor position from a voltage measurement while disconnecting a phase, the voltage being caused by mutual inductance variations. The respective phase is disconnected when phase current is zero, i.e. when the drive current has a zero crossing. Now the rotor position is detectable at any low rotational speed from zero speed, while only some additional voltage dividers may be needed to accommodate phase voltage measurement. There is no additional noise or shaft vibration, and it is possible to start rotation with a high motor torque. Rotor position synchronization may be needed at first start-up. For higher speed the traditional Back-EMF monitoring may be used.

Figure 1:
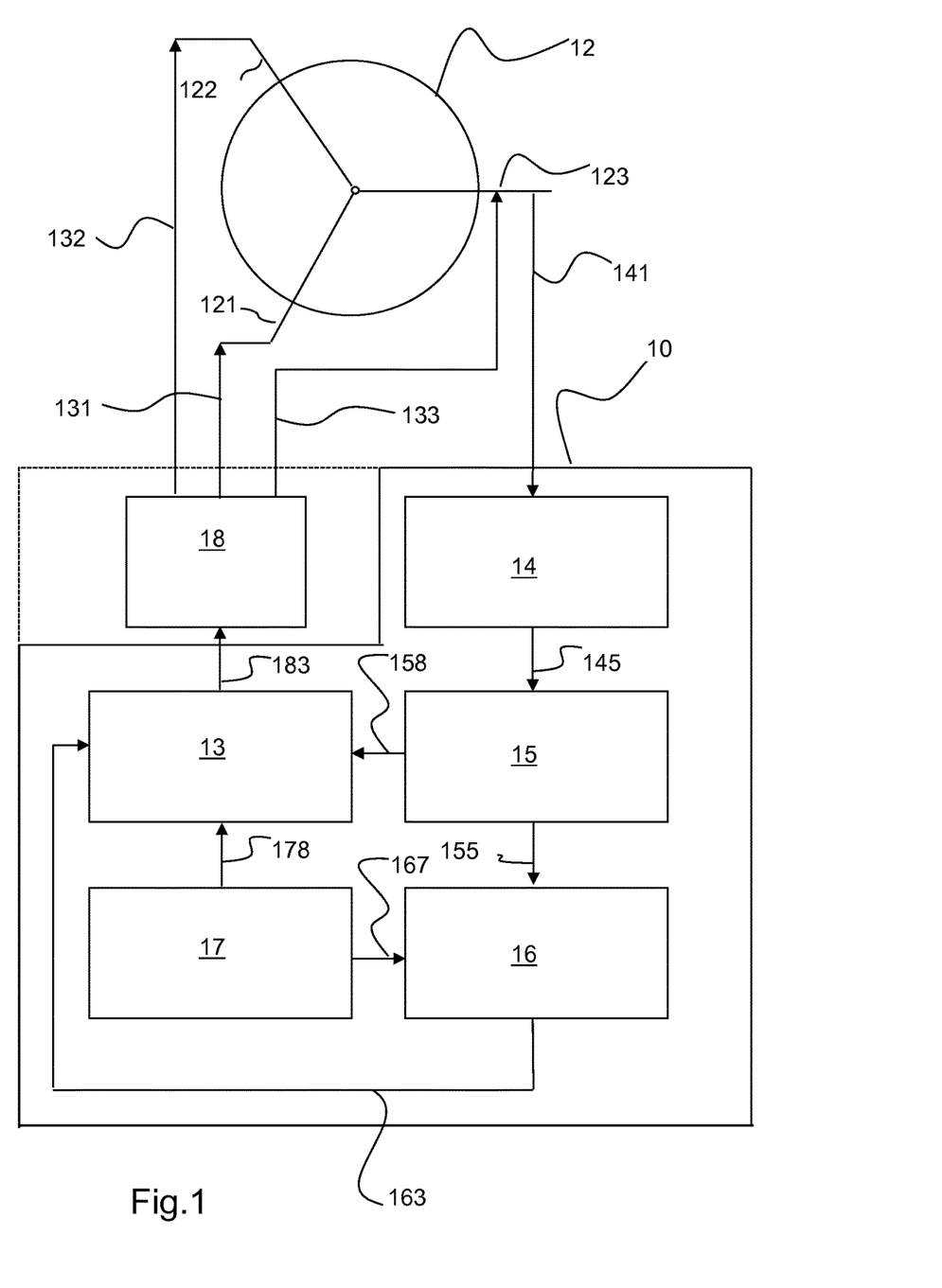
FIG. 1 shows an example of a device for determining a rotor position in a polyphase synchronous electric motor.

FIG. 1 shows an example of a device for determining a rotor position in a polyphase synchronous electric motor. The motor 12 has stator coils constituting three phases 121, 122, 123 and a rotor. The rotor of the electric motor comprises, in the example, a permanent magnet having a north pole and a south pole, and is able to rotate around a virtual centerline which is transversely oriented on the paper of the drawing. The rotor is arranged to rotate with respect to the stator housing wherein the stator coils are mounted.

The device 10 for determining a rotor position has a power control unit 13 for applying drive voltages 131, 132, 133 on each of the three phases. The drive voltages comprise drive pulses alternating between a zero voltage and a supply voltage according to a pulse width modulation (PWM) scheme so as to generate sinusoidal phase currents in each of the phases for synchronously driving the motor. It is to be noted that, in this document for synchronously driving an electrical motor, sinusoidal means any periodical current that has a positive part and a negative part and zero crossings between both parts, the frequency thereof being synchronous to the rotation frequency of the motor. The pulses of the PWM scheme are at a substantially higher frequency and modulated in width so as to generate such sinusoidal currents at the rotation frequency.

The device 10 may be provided with a power drive circuit 18 for providing the power to the motor, which power drive circuit is controlled via control signals 183 by the power control unit 13 for generating the drive voltages to be applied by the power drive circuit to respective phases 121, 122, 123. The power drive circuit 18 may be part of the device as indicated by the dashed line, or may be provided externally to enable larger motors to be provided with large currents.

The power control unit 13 is to be provided with information about the position of the rotor. Therefore, the device 10 has a measurement unit 14, and a position unit 15. The device may further include a memory unit 16, and a synchronization unit 17, which will be described hereinafter. The power control unit is adapted to receive position output signals 158 representing the rotor position based on the determined voltage values as described now.

Figure 2:
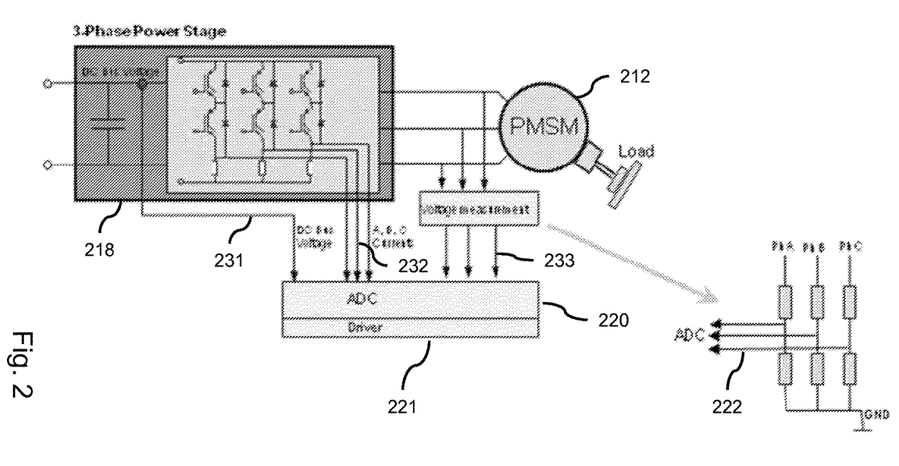
FIG. 2 shows an example of a system for driving a PMSM.

The measurement unit 14 is arranged for measuring a voltage 141 on a respective phase as follows. First a zero-crossing interval is determined where the respective phase current is around zero. Measuring the phase current is performed in the power control circuit, for example as shown in FIG. 2, and is usually provided for controlling the drive current according to the PWM control, known as such. Subsequently, during the zero-crossing interval, the respective phase is disconnected from the respective drive voltage. Disconnecting the drive voltage may be accomplished by a separate electronic switch, or by controlling the power drive transistors not to conduct any current. Furthermore, at least one measurement interval in the zero-crossing interval is determined, where the drive voltage of a first other phase is the supply voltage and the drive voltage of a second other phase is the zero voltage. Various options for determining the measurement interval are described below. During the measurement interval a first one of the two other phases is powered by coupling to the supply voltage, while the second one of the other two phases is coupled to the zero voltage. Finally a voltage value 145 on the respective phase is measured during the measurement interval.

The position unit 15 is arranged for determining the rotor position based on the voltage value. The voltage value may be compared to the actual supply voltage, also called DCbus voltage, as additionally measured. The voltage value on the respective, disconnected phase, is proportionally related to the position of the rotor. Effectively the relation is substantially linear for relatively small deviations of the rotor angle with respect to the magnetic field of the synchronously controlled drive currents. The position unit may have a predetermined ratio for converting the voltage value into a rotor angle error with respect to the nominal rotor position according to the magnetic field of the drive currents. The relation may also be stored in a memory, or be represented by a function based on a few parameters that are determined by design or measurement of the motor.

Determining of the rotor position is based on the electric property of mutual inductance between the stator coils of the electric motor, since the mutual inductance varies as a function of the rotor position. The mutual inductance of the motor varies with the rotor position due to the reluctance variation as the rotor position changes. Alternatively or additionally actual measurements may be performed to determine the actual relation between the voltage value and the angle of the rotor. Based on the measurements a function may be fitted, and may be used in the calculation unit. Alternatively, the rotor position can be determined by using a look-up table, in which table data is stored of the rotor angular position for specific voltage values.

It is noted that system for the determination of the rotor position may be similarly applied to a polyphase motor having more than three coil sections, which repetitively generate respective phase magnetic stator fields, and a corresponding rotor having multiple poles.

The voltages on the phases may be defined with respect to a zero level Vz. The drive voltages on the phases may be generated by pulses that alternate from the zero level to a supply voltage. It is noted that, in this document, voltages and polarities are defined with respect to such a zero level. The supply source may alternatively provide both a positive and a negative supply voltage, so that the supply ground level corresponds to about a voltage at 50% between the zero level and the supply voltage level.

The device 10 may be provided with a memory unit 16 for storing a position value corresponding to the rotor position and/or for maintaining the rotor position value while the rotor is not rotating. Therefore, the memory unit 16 is adapted to receive a position output signal 155 of the rotor position based on the determined voltage value. The stored position value may be provided to the power control unit 13 as indicated by the arrow 163.

It is noted, that at some instants, the rotor position may be unknown, for example immediately after power up, when the memory contents are invalid, or after a period without measurements and analysis of the difference value. Moreover, although the above mentioned system may detect a rotor position, it cannot resolve the symmetry of the rotor, e.g. in a 3 coil stator and single north/south pole rotor, the symmetry results in substantially the same difference value each 180 degrees of rotation. To resolve this uncertainty, an initial position of the rotor must be determined, which is also called synchronization.

For example, synchronization may be based on detecting a difference in a maximum value of the difference signal when the rotor north or south pole is aligned with the first or second stator coil. A relatively small difference in the maximum signal value may be detected between the north pole and the south pole signal.

The device 10 may be provided with a synchronization unit 17 for determining an initial position of the rotor. The synchronization unit may be arranged to synchronize the rotor, for example for the case that the power has been switched off and the orientation of the rotor is unknown. The synchronization unit 17 may provide a memory unit output signal 167 of the rotor position initially determined by said synchronization. In order maintain this information may be stored in the memory unit 16. For performing the synchronization as described below, a synchronization unit output signal 178 may be sent to the power control unit 13 for powering respective coils of the stator.

Optionally the synchronization unit is arranged for setting the rotor in a pre-determined position with respect to the stator by applying at least one pre-determined input voltage on at least one of the coils, so as to rotate the rotor to the pre-determined position. By powering the electric motor by pre-determined voltages the rotor is rotated to a reference position with respect to the stator, in which position, for example, the north pole is facing a nearest coil mounted in the stator. Thereto said stator coil may be powered by a continuous signal of a predetermined polarity, or the pulse width modulated signals may be adjusted to that effect, for rotating the rotor. When the rotor arrives in said position, the rotor position is known and stored in the memory unit.

Optionally, alignment is done using the PWM signals, by generating a magnetic field of one direction for a few milliseconds. After this time rotor is oriented according this magnetic field. There are two possibilities how to done alignment. Using all 3 phase or only 2 phases:

1. 3-Phase Alignment—for example 70% of duty cycle on phase A and B and 30% of duty cycle on phase C, will rotate the north pole to phase C 2. 2-Phase Alignment—for example 70% of duty cycle only on phase A and 30% of duty cycle on phase C; will rotate the north pole between B and C.

A further way of synchronizing is by determining the initial position of the rotor as described in the document "Initial Rotor Position Estimation of an Interior Permanent-Magnet Synchronous Machine Using Carrier-Frequency Injection Methods", by YU-SEOK JEONG, ROBERT D. LORENZ, THOMAS M. JAHNS, AND SEUNG-KI SUL, as published in IEEE TRANSACTIONS ON INDUSTRY APPLICATIONS, VOL. 41, NO. 1, JANUARY/FEBRUARY 2005. In the document a system is described for detecting an initially unknown position of a rotor by using high frequency voltages on at least one winding and detecting the response.

FIG. 2 shows an example of a system for driving a PMSM. The Figure shows a permanent magnet synchronous motor (PMSM) 212 and a load. The motor is coupled to a power drive unit 218 (called 3-Phase Power Stage) comprising a set of power transistors for driving each phase of the motor by drive signals. Each set of power transistors has a series resistor for providing current detection signals 232 to an analog to digital converter 220. The analog to digital converter (ADC) may be used to measure the phase voltage values and the drive currents. The currents may be measurement by inserting a measurement resistor in series with the respective drive current. The phase voltages may be measured via a voltage divider arrangement 222 so as to generate phase voltage measurement signals 233 coupled to the ADC. A voltage divider may be provided for each of the phases Phase A, Phase B and Phase C. Alternatively, a special circuit for voltage measurement may be provided, e.g. some type of voltage sensor. The digital values as converted by the ADC 220 are coupled to a driver unit 221, which generates respective control signals to control the power drive unit as required. A further signal 231 is provided for measuring the supply voltage of the power drive unit, also called the DC Bus voltage.

Figure 3:
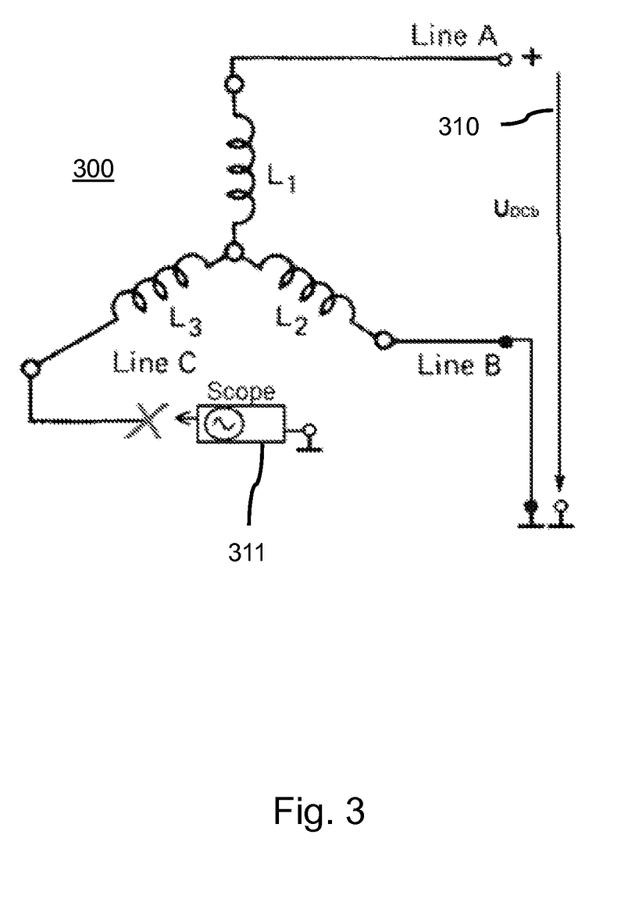
FIG. 3 shows an example of an electric motor and a measurement set-up.

FIG. 3 shows an example of an electric motor and a measurement set-up. The Figures shows a motor 300 having 3 stator coils; coil L1 driven by phase line A, coil L2 driven by phase line B and coil L3 driven by phase line C. For elucidating the measurement signals in FIGS. 4 and 5 the phase line C is shown to be disconnected and coupled to a measurement device (scope) 311. Phase line B is shown to be connected to a zero voltage, whereas phase line A is shown to be connected to the supply voltage UDCB. The situation as shown is similar to the conditions of the zero-crossing interval as described above, where the drive current in coil L3 is about zero.

A measurement unit is arranged for measuring a voltage value on a respective phase in a zero-crossing interval where the respective phase current is around zero. After detecting such zero crossing the respective phase is disconnected, i.e. all transistors in the power drive unit are controlled not to conduct any current. So, after detecting the phase C current zero cross, the PWM outputs for the phase C are disabled when current zero cross reached. Next the phase B is connected to the DC bus negative voltage, usually called zero voltage. Such connection may be actively controlled, or may occur during continuing PWM operation. Also the supply voltage on phase A may be actively controlled, or may occur during continuing PWM operation. Hence a measurement interval in the zero-crossing interval is determined where the drive voltage of a first other phase is the supply voltage and the drive voltage of a second other phase is the zero voltage.

After the respective voltages are present in the so-called measurement interval, it may be necessary to wait for the voltage on phase C to stabilize after the transient event. Next, the voltage value on the disconnected phase C is measured. Due to mutual inductance rotor position can be computed from the measured voltage. The calculated position may be compared to an expected position according to the synchronous drive voltages, where the zero crossing of the current via phase C coincides with the rotor being positioned in a predetermined alignment with the coils of phase C. So the estimated position may be corrected. After the measurement the drive unit continues in normal PWM operation, and a next measurement may be started after waiting for a next phase current zero cross. Due to the synchronous operation the drive currents are sinusoidal, while one period of the sinus corresponds to one revolution and provide two zero crossings. So for a 3 phase motor there are 6 zero crossing and therefore 6 possible measurements during one revolution of the motor. The method is able to detect position when the rotor is moving, so may detect the position 6 times per electrical revolution (every 60° angle). In a practical example the PWM was applied using 16 Khz pulses. As the phase is shortly disconnected when the phase current is near zero only a minimal current (or torque) ripple is observed.

It is noted that there are several ways how to measure voltage and disconnect the phase. A first measurement method is suitable for motors with low inductances.

Figure 4A:
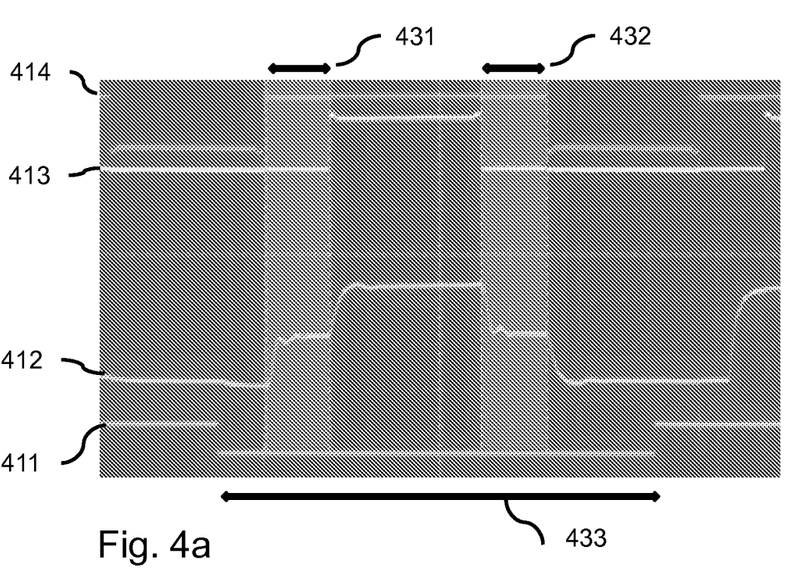
FIG. 4 shows an example of measurements based on phase voltages of a first measurement method.

FIG. 4 shows an example of measurements based on phase voltages of a first measurement method. FIG. 4a displays a first example of a phase A voltage 414, a phase B voltage 413 and a phase C voltage 412, and a zero-crossing signal 411. When the zero-crossing signal 411 is low, the respective phase drive current is about zero. A zero-crossing interval indicated by an arrow 433 is generated based on the zero-crossing signal, and the respective phase is disconnected from the drive signal. In the zero-crossing interval conditions for a measurement interval are that there must be a voltage difference between phases A and B, which occurs due to the pulse width of pulses at phase A 414 being broader than the pulses at phase B 413. So the phase A voltage is high, i.e. the supply voltage and the phase B voltage is low, i.e. the zero voltage. As shown, during PWM control of phases A and B, there are two possible measurement intervals 431, 432. The phase C voltage value can be sensed only in the measurement interval, when effectively the supply voltage is applied between phase A and B. At such moment phase C must be disconnected from the power drive stage.

Figure 4B:
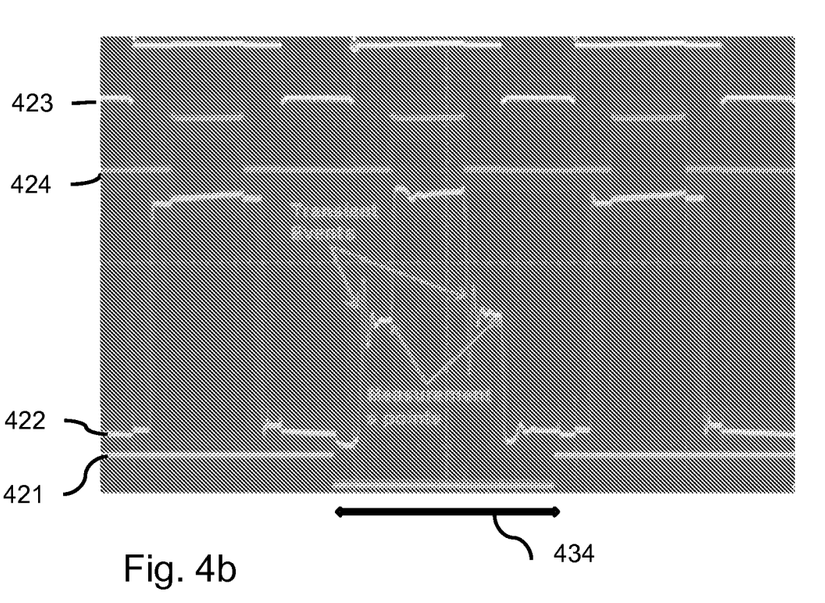

FIG. 4b displays a further example of a phase A voltage 424, a phase B voltage 423 and a phase C voltage 422, and a zero-crossing signal 421. When the zero-crossing signal 421 is low, the respective phase drive current is about zero. A zero-crossing interval indicated by an arrow 434 is generated based on the zero-crossing signal, and the respective phase is disconnected from the drive signal. The conditions for a measurement interval occur due to the pulse width of pulses at phase A 424 being smaller than the pulses at phase B 423. So the phase B voltage is high, i.e. the supply voltage and the phase A voltage is low, i.e. the zero voltage, so again two measurements intervals enable two measurement points as indicated in the Figure. Optionally, the measurement in the measurement interval is performed near the end of the interval so as to provide some time for transient events to stabilize. Such transient events occur after the voltage on phase B has gone high while A is low, and when phase A goes low while B is still high, as indicated in the Figure by arrows.

It is noted that the first method may be used when the transient event is short enough to measure a voltage. The first and/or second measurement interval may be selected to take a voltage sample. The PWM generation for phase A an B is not affected, and there is minimal impact to current waveform of disconnected phase. The first method is suitable for motors with relatively small inductances. Normal PWM generation, i.e. standard sinusoidal control, for phases A and B is continued during the measurements. There is minimal torque/current ripple, and minimal noise generation.

A second method may be used, when the transient event is relatively long, i.e. too long to accurately measure a voltage. In this case the PWM B signal generation is modified. The Phase B voltage is temporarily connected to the DC bus negative, i.e. zero voltage. Now an increased time for voltage measurement interval is available when phase A is high and phase B is zero/negative and phase C is disconnected. In this case there is created a single long interval to take a voltage sample.

Figure 5A:
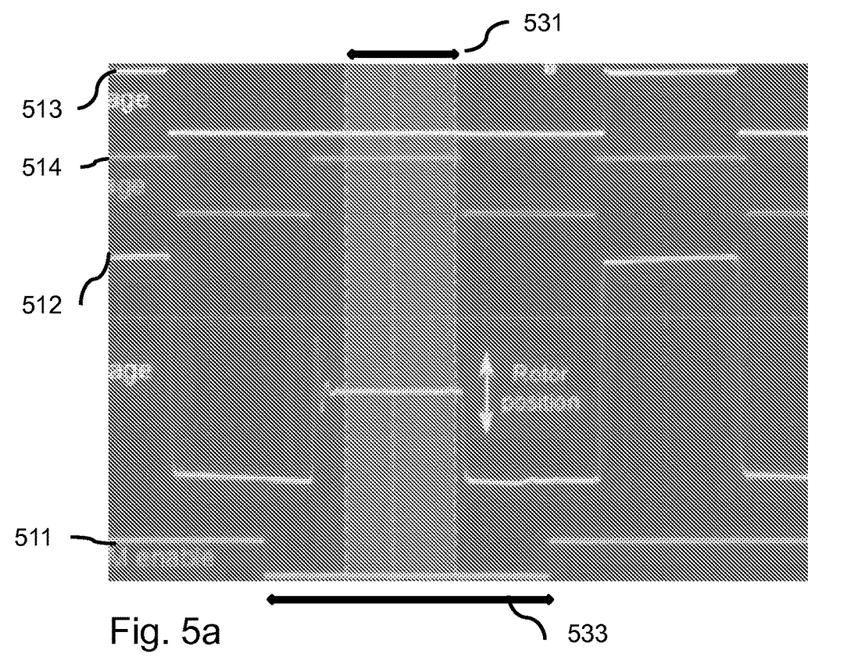
FIG. 5 shows an example of a measurement based on phase voltages of a second measurement method.

FIG. 5 shows an example of a measurement based on phase voltages of a second measurement method. FIG. 5a displays a second example of a phase A voltage 514, a phase B voltage 513 and a phase C voltage 512, and a zero-crossing signal 511. When the respective phase drive current is about zero, the zero-crossing signal 511 is low. A zero-crossing interval indicated by an arrow 533 is generated based on the zero-crossing signal, and the respective phase is disconnected from the drive signal. In the zero-crossing interval conditions for a measurement interval are created by controlling the phase B voltage 513 to remain low, e.g. by suppressing a pulse. Now a single, longer measurement interval 531 is provided during the pulse of phase A, i.e. phase A voltage 514 being the supply voltage. The measurement interval is started after the transition events, e.g. by applying a predetermined delay after the voltage on phase A has alternated to the supply voltage. The voltage value in the measurement interval is detected, and is indicative for the rotor position.

Figure 5B:
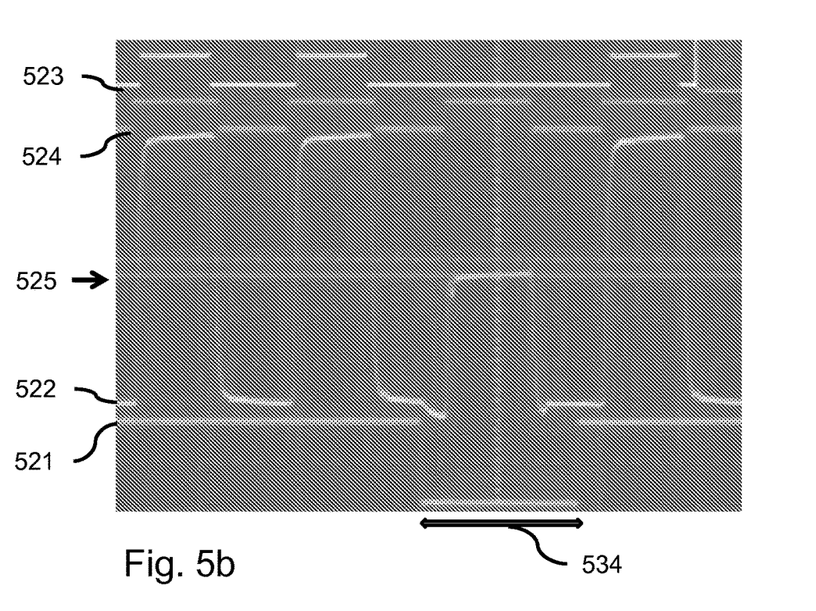

FIG. 5b displays a further example of a phase A voltage 524, a phase B voltage 523 and a phase C voltage 522, and a zero-crossing signal 521. When the respective phase drive current is about zero, the zero-crossing signal 511 is low. A zero-crossing interval indicated by an arrow 534 is generated based on the zero-crossing signal, and the respective phase is disconnected from the drive signal. In the zero-crossing interval conditions for a measurement interval are created by controlling the phase B voltage 523 to remain low, e.g. connecting to the zero voltage. A single measurement interval is provided during the pulse of phase A, i.e. phase A voltage 524 being the supply voltage. The voltage value 525 in the measurement interval is detected, and is indicative for the rotor position.

It is noted that the second method is suitable for motors with higher inductances, when relatively long transient events occur, for example a High Voltage motor. Now the phase voltage B is controlled to be zero. There a little more torque/current ripple and noise generation. The voltage measurement interval is significantly extended, because one other phase is switched to zero for whole PWM period, enabling a longer time to stabilize any transient events.

Optionally, in the device for determining a rotor position in a polyphase synchronous electric motor, the measurement unit is arranged for initiating the zero-crossing interval based on detecting the respective phase current being below a predetermined threshold. The threshold may be set slightly above the zero current line, or at zero, so that the zero-crossing interval is initiated when the respective phase current is about zero. The length of the zero crossing interval may be predetermined, e.g. two PWM periods, so that at least one full PWM pulse is included for performing the measurement.

Optionally, in the device, the measurement unit is arranged for initiating the zero-crossing interval based on the drive voltages of both other phases being the zero voltage. The condition of both other phases being zero will be followed by one phase being pulsed to the supply voltage, so enabling the measurement.

Optionally, in the device, the measurement unit is arranged for initiating the zero-crossing interval based on the respective drive voltage of the respective phase being the zero voltage. During PWM drive the phase voltage will alternate between about zero and about the supply voltage. The condition of the phase voltage being zero, in combination with the phase current being zero, enables disconnecting the respective phase without transient voltages.

Optionally, in the device, the measurement unit is arranged for determining the measurement interval based detecting that the drive voltage on the first other phase is the supply voltage, while the drive voltage on the second other phase is the zero voltage. During PWM drive, while the to be measured phase is disconnected, the phase voltages on both other phases will alternate between about zero and about the supply voltage, and at some time intervals be different. The condition of one phase being the supply voltage and the other phase being zero enables the measurement of the voltage value at the disconnected phase. The measurement unit may be arranged for terminating the measurement interval when the drive voltages of both other phases are the zero voltage.

Optionally, in the device, the measurement unit is arranged for initiating the measurement interval based on the drive voltage on the first other phase alternating to the supply voltage, while the drive voltage on the second other phase is the zero voltage. The start of the pulse on the first other phase may be easily detected, or may be controlled by the power control unit. Based on the timing of the pulse the measurement interval may start. A delay may be applied to enable any transient events to die out.

Optionally, in the device, the measurement unit is arranged for initiating the measurement interval based on the drive voltage on the first other phase being the supply voltage, while the drive voltage on the second other phase is alternating to the zero voltage. The end of the pulse on the second other phase may be easily detected, or may be controlled by the power control unit. Based on the timing of the pulse the measurement interval may start. A delay may be applied to enable any transient events to die out.

Optionally, in the device, the measurement unit is arranged for determining the measurement interval by controlling the drive voltage of the second other phase to the zero voltage. By actively connecting the second other phase to the zero voltage while the phase to be measured is disconnected, enables the measurement interval to be simultaneous to the pulse on the first other phase. So the measurement interval coincides with the pulse on the first other phase, enabling a relatively long measurement time. Said controlling the drive voltage of the second other phase may comprises suppressing the drive voltage of the second other phase to alternate to the supply voltage. For example the measurement circuit temporarily suppresses any pulses in the drive voltage via the power control unit. Also, said controlling the drive voltage of the second other phase may involve connecting the second other phase to the zero voltage, e.g. by additionally controlling the respective transistor in the power drive circuit.

Optionally, in the device, the measurement unit is arranged for measuring the voltage value at a measurement point after a predetermined period after the drive voltage of a first other phase has alternated to the supply voltage, and/or after a predetermined period after the drive voltage of a second other phase has alternated to the zero voltage. Delaying the measurement enables any transient events to die out. The measurement unit may also be arranged for measuring the voltage value during the measurement interval at a measurement point just before the drive voltage of a first other phase alternates to the zero voltage and/or just before the drive voltage of a second other phase alternates to the supply voltage. Taking a sample just before the end of the PWM pulse provides an accurate voltage value, because the voltage on the disconnected phase has been allowed the maximum time to stabilize.

In practice, the device may be implemented in an integrated circuit, which may comprise one or more devices for determining a rotor position in a polyphase synchronous electric motor as described above.

Figure 6:
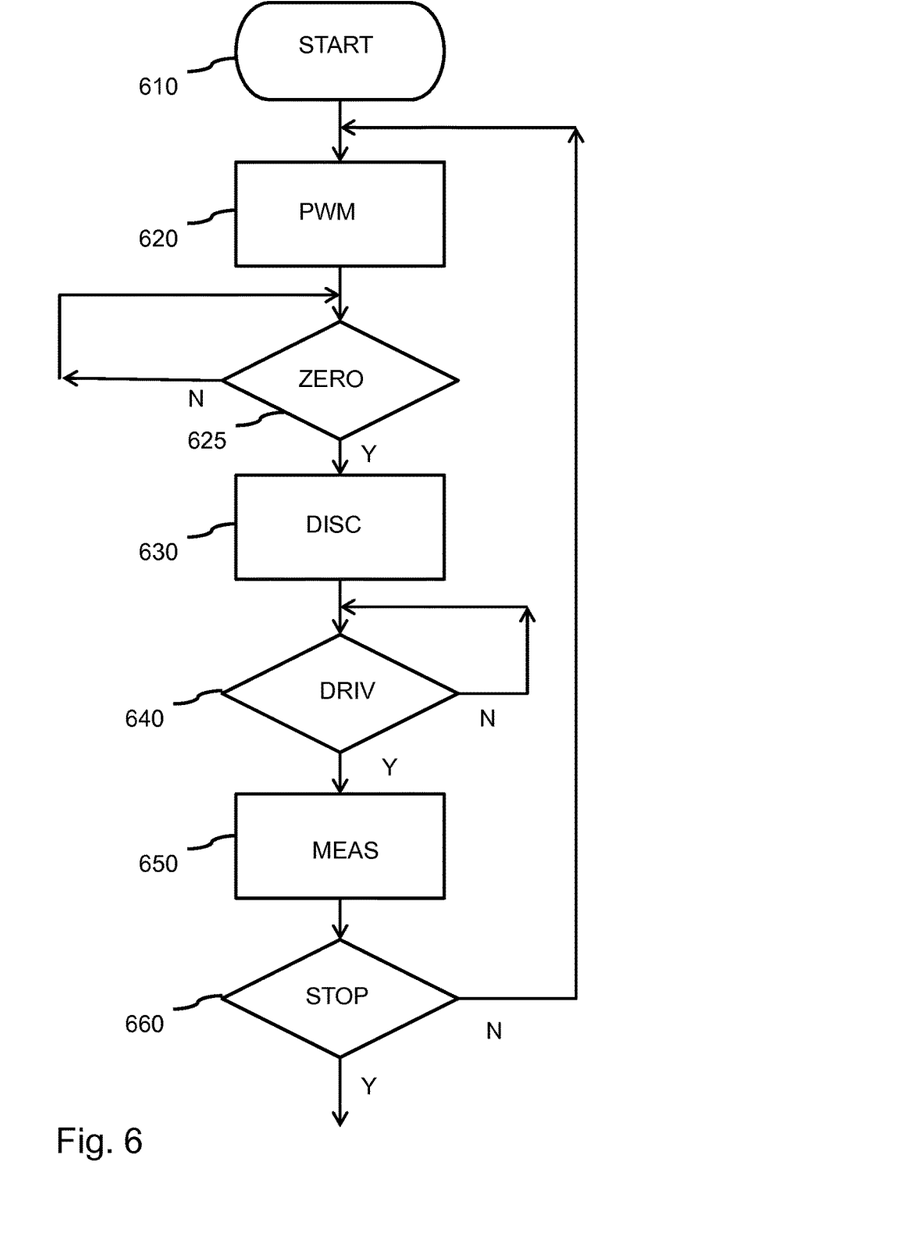
FIG. 6 shows an example of a method of determining a rotor position.

FIG. 6 shows an example of a method of determining a rotor position. The figure shows a flow for determining a rotor position in a polyphase synchronous electric motor. The method starts at node START 610. Subsequently the motor is driven to rotate at step PWM 620, by applying drive voltages on each of the phases of the motor, the drive voltages comprising drive pulses alternating between a zero voltage and a supply voltage according to a pulse width modulation scheme so as to generate sinusoidal phase currents in each of the phases for synchronously driving the motor. Subsequently a measurement of a voltage value on a respective phase is performed as follows. In next step ZERO 625 it is tested whether the respective phase current is around zero, if not the step is repeated. When zero current is detected, a zero-crossing interval is started. Next step DISC 630 involves disconnecting the respective phase from the respective drive voltage during the zero-crossing interval. In next step DRIV 640 is is determined whether the drive voltage of a first other phase is the supply voltage and the drive voltage of a second other phase is the zero voltage. If so, determining a measurement interval in the zero-crossing interval is started. In next step MEAS 650 the voltage value on the disconnected phase is measured during the measurement interval. The voltage value is indicative of the rotor position, and the rotor position is determined based on the voltage value. Finally, in step STOP 660, the system determines whether to stop or to continue the operation. Normally the rotation of the motor will be continued and the method returns to step PWM 620, where the normal operation is resumed and the respective phase is connected again to the respective rive voltage.

It is noted that that the method may be used to detect a locked rotor. For example, when the phase currents are generated to drive synchronous rotation, and the position error of the rotor appears to be periodically changed, the system may establish that the rotor cannot move. Detection a locked rotor can be utilized in many applications. So, the method may be extended by a locked rotor detecting step based on determining multiple rotor positions, as follows.

A locked rotor may be detected based on detecting multiple rotor positions and establishing multiple rotor position errors. A rotor position error may be determined by comparing a determined rotor position to an expected position corresponding to the sinusoidal phase currents in each of the phases that are synchronously driving the motor. Due to the sinusoidal phase currents a rotating magnetic field is created, that normally corresponds to the rotation of the rotor. For example, by detecting a sequence of position errors a locked rotor can be detected. By using multiple measurements during one revolution of the magnetic fields, the error values of the multiple measurements may be combined to detect a locked rotor.

Optionally, in order to determine the rotor position while rotating, in the device 10 of FIG. 1 the measurement unit 14 and the position unit 15 may be arranged for determining multiple rotor positions. The position unit may be arranged for detecting a time interval between the position measurements, and calculate an estimated speed of rotation. Basically the speed may be determined by taking at least two measurements of the rotor position by applying any of the methods as described above. So, in the device, the position unit may be arranged for determining a speed of rotation by determining a multitude of consecutive rotor positions.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Also, the invention is not limited to physical devices or units implemented in non-programmable hardware but can also be applied in programmable devices, such as a FPGA (Field Programmable Gate Array) or units able to perform the desired device functions by operating in accordance with suitable program code, e.g. so-called firmware. The FPGA is an integrated circuit designed to be configured by a customer or a designer after manufacturing, so-called "field-programmable". The FPGA configuration is generally specified using a hardware description language (HDL). Furthermore, the device may be physically distributed over a number of apparatuses, while functionally operating as a single device.

Furthermore, the units and circuits may be suitably combined in one or more semiconductor devices.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A device for determining a rotor position in a polyphase electric motor having stator coils comprising three phases, the device comprising:
   a power control unit configured to apply drive voltages on each of the three phases, wherein the drive voltages comprise drive pulses alternating between a zero voltage and a supply voltage according to a pulse width modulation scheme so as to generate sinusoidal phase currents in each of the phases for synchronously driving the motor;
   a measurement unit arranged for measuring a voltage value on a respective phase by
      determining a zero-crossing interval where the respective phase current is around zero,
      disconnecting the respective phase from the respective drive voltage during the zero-crossing interval,
      determining at least one measurement interval in the zero-crossing interval where the drive voltage of a first other phase is the supply voltage and the drive voltage of a second other phase is the zero voltage, and
      measuring the voltage value during the measurement interval;
   a position unit configured to determine the rotor position based on the voltage value,
   wherein the measurement unit is arranged for initiating the zero-crossing interval based on detecting the respective phase current being below a predetermined threshold.

2. The device as claimed in claim 1, wherein the measurement unit is arranged for determining the measurement interval based detecting that the drive voltage on the first other phase is the supply voltage, while the drive voltage on the second other phase is the zero voltage.

3. The device as claimed in claim 1, wherein the measurement unit is arranged for initiating the measurement interval based on the drive voltage on the first other phase alternating to the supply voltage, while the drive voltage on the second other phase is the zero voltage.

4. The device as claimed in claim 1, wherein the measurement unit is arranged for initiating the measurement interval based on the drive voltage on the first other phase being the supply voltage, while the drive voltage on the second other phase is alternating to the zero voltage.

5. The device according to claim 1, wherein the position unit is arranged for determining a speed of rotation by determining a multitude of consecutive rotor positions.

6. The device according to claim 1, comprising a memory unit adapted to register a position value of the rotor for maintaining the rotor position value while the rotor is not rotating.

7. An integrated circuit comprising at least one device according to claim 1.

8. A device for determining a rotor position in a polyphase electric motor having stator coils comprising three phases, the device comprising:

a power control unit configured to apply drive voltages on each of the three phases, wherein the drive voltages comprise drive pulses alternating between a zero voltage and a supply voltage according to a pulse width modulation scheme so as to generate sinusoidal phase currents in each of the phases for synchronously driving the motor;

a measurement unit arranged for measuring a voltage value on a respective phase by determining a zero-crossing interval where the respective phase current is around zero, disconnecting the respective phase from the respective drive voltage during the zero-crossing interval, determining at least one measurement interval in the zero-crossing interval where the drive voltage of a first other phase is the supply voltage and the drive voltage of a second other phase is the zero voltage, and measuring the voltage value during the measurement interval;

a position unit configured to determine the rotor position based on the voltage value, wherein the measurement unit is arranged for initiating the zero-crossing interval based on the drive voltages of both other phases being the zero voltage.

9. A device for determining a rotor position in a polyphase electric motor having stator coils comprising three phases, the device comprising:

a power control unit configured to apply drive voltages on each of the three phases, wherein the drive voltages comprise drive pulses alternating between a zero voltage and a supply voltage according to a pulse width modulation scheme so as to generate sinusoidal phase currents in each of the phases for synchronously driving the motor;

a measurement unit arranged for measuring a voltage value on a respective phase by determining a zero-crossing interval where the respective phase current is around zero, disconnecting the respective phase from the respective drive voltage during the zero-crossing interval, determining at least one measurement interval in the zero-crossing interval where the drive voltage of a first other phase is the supply voltage and the drive voltage of a second other phase is the zero voltage, and measuring the voltage value during the measurement interval;

a position unit configured to determine the rotor position based on the voltage value, wherein the measurement unit is arranged for initiating the zero-crossing interval based on the respective drive voltage of the respective phase being the zero voltage.

10. A device for determining a rotor position in a polyphase electric motor having stator coils comprising three phases, the device comprising:

a power control unit configured to apply drive voltages on each of the three phases, wherein the drive voltages comprise drive pulses alternating between a zero voltage and a supply voltage according to a pulse width modulation scheme so as to generate sinusoidal phase currents in each of the phases for synchronously driving the motor;

a measurement unit arranged for measuring a voltage value on a respective phase by determining a zero-crossing interval where the respective phase current is around zero, disconnecting the respective phase from the respective drive voltage during the zero-crossing interval, determining at least one measurement interval in the zero-crossing interval where the drive voltage of a first other phase is the supply voltage and the drive voltage of a second other phase is the zero voltage, and measuring the voltage value during the measurement interval;

a position unit configured to determine the rotor position based on the voltage value, wherein the measurement unit is arranged for determining the measurement interval by controlling the drive voltage of the second other phase to the zero voltage, and wherein the controlling the drive voltage of the second other phase comprises the measurement unit arranged for suppressing the drive voltage of the second other phase to alternate to the supply voltage.

11. The device as claimed in claim 10, wherein the controlling the drive voltage of the second other phase comprises the measurement unit arranged for connecting the second other phase to the zero voltage.

12. A device for determining a rotor position in a polyphase electric motor having stator coils comprising three phases, the device comprising:

a power control unit configured to apply drive voltages on each of the three phases, wherein the drive voltages comprise drive pulses alternating between a zero voltage and a supply voltage according to a pulse width modulation scheme so as to generate sinusoidal phase currents in each of the phases for synchronously driving the motor;

a measurement unit arranged for measuring a voltage value on a respective phase by determining a zero-crossing interval where the respective phase current is around zero, disconnecting the respective phase from the respective drive voltage during the zero-crossing interval, determining at least one measurement interval in the zero-crossing interval where the drive voltage of a first other phase is the supply voltage and the drive voltage of a second other phase is the zero voltage, and measuring the voltage value during the measurement interval;

a position unit configured to determine the rotor position based on the voltage value, wherein the measurement unit is arranged for measuring the voltage value at a measurement point after one or more of a predetermined period after the drive voltage of a first other phase has alternated to the supply voltage and a predetermined period after the drive voltage of a second other phase has alternated to the zero voltage.

13. A device for determining a rotor position in a polyphase electric motor having stator coils comprising three phases, the device comprising:

a power control unit configured to apply drive voltages on each of the three phases, wherein the drive voltages comprise drive pulses alternating between a zero voltage and a supply voltage according to a pulse width modulation scheme so as to generate sinusoidal phase currents in each of the phases for synchronously driving the motor;

a measurement unit arranged for measuring a voltage value on a respective phase by determining a zero-crossing interval where the respective phase current is around zero, disconnecting the respective phase from the respective drive voltage during the zero-crossing interval, determining at least one measurement interval in the zero-crossing interval where the drive voltage of a first other phase is the supply voltage and the drive voltage of a second other phase is the zero voltage, and measuring the voltage value during the measurement interval;

a position unit configured to determine the rotor position based on the voltage value, wherein the measurement unit is arranged for measuring the voltage value during the measurement interval at a measurement point of one or more of just before the drive voltage of a first other phase alternate to the zero voltage and just before the drive voltage of a second other phase alternate to the supply voltage.

14. A device for determining a rotor position in a polyphase electric motor having stator coils comprising three phases, the device comprising:

a power control unit configured to apply drive voltages on each of the three phases, wherein the drive voltages comprise drive pulses alternating between a zero voltage and a supply voltage according to a pulse width modulation scheme so as to generate sinusoidal phase currents in each of the phases for synchronously driving the motor;

a measurement unit arranged for measuring a voltage value on a respective phase by determining a zero-crossing interval where the respective phase current is around zero, disconnecting the respective phase from the respective drive voltage during the zero-crossing interval, determining at least one measurement interval in the zero-crossing interval where the drive voltage of a first other phase is the supply voltage and the drive voltage of a second other phase is the zero voltage, and measuring the voltage value during the measurement interval;

a position unit configured to determine the rotor position based on the voltage value, wherein the measurement unit is arranged for terminating the measurement interval when the drive voltages of both other phases are the zero voltage.

15. The device according to claim 14, wherein the position unit is arranged for determining a speed of rotation by determining a multitude of consecutive rotor positions.

16. A device for determining a rotor position in a polyphase electric motor having stator coils comprising three phases, the device comprising:

a power control unit configured to apply drive voltages on each of the three phases, wherein the drive voltages comprise drive pulses alternating between a zero voltage and a supply voltage according to a pulse width modulation scheme so as to generate sinusoidal phase currents in each of the phases for synchronously driving the motor;

a measurement unit arranged for measuring a voltage value on a respective phase by determining a zero-crossing interval where the respective phase current is around zero, disconnecting the respective phase from the respective drive voltage during the zero-crossing interval, determining at least one measurement interval in the zero-crossing interval where the drive voltage of a first other phase is the supply voltage and the drive voltage of a second other phase is the zero voltage, and measuring the voltage value during the measurement interval;

a position unit configured to determine the rotor position based on the voltage value, and further comprising a synchronization unit for determining an initial position of the rotor.

17. The device of claim 16, wherein the synchronization unit is arranged for setting the rotor in a pre-determined position with respect to the stator by applying at least one pre-determined input voltage on at least one of the coils, so as to rotate the rotor to the pre-determined position.

18. The device according to claim 16, wherein the position unit is arranged for determining a speed of rotation by determining a multitude of consecutive rotor positions.

19. A method of determining a rotor position in a polyphase synchronous electric motor that has stator coils comprising three phases, the method comprising:

applying drive voltages on each of the three phases, wherein the drive voltages comprise drive pulses alternating between a zero voltage and a supply voltage according to a pulse width modulation scheme so as to generate sinusoidal phase currents in each of the phases for synchronously driving the motor;

measuring a voltage value on a respective phase by determining a zero-crossing interval where the respective phase current is around zero, disconnecting the respective phase from the respective drive voltage during the zero-crossing interval, determining at least one measurement interval in the zero-crossing interval where the drive voltage of a first other phase is the supply voltage and the drive voltage of a second other phase is the zero voltage, and measuring the voltage value during the measurement interval;

determining the rotor position based on the voltage value; and detecting a locked rotor based on detecting multiple rotor positions and establishing multiple rotor position errors by comparing said multiple positions to expected positions corresponding to the sinusoidal phase currents in each of the phases for synchronously driving the motor.

* * * * *